Dec. 8, 1942.     L. R. BAYLESS     2,304,671
LISTER HARROW
Filed June 30, 1941

Inventor
Lyonel Roscoe Bayless
By Carl Miller
Attorney

Patented Dec. 8, 1942

2,304,671

UNITED STATES PATENT OFFICE 2,304,671

LISTER HARROW

Lyonel Roscoe Bayless, Protection, Kans.

Application June 30, 1941, Serial No. 400,436

7 Claims. (Cl. 97—140)

This invention relates to an improvement in harrows especially adapted for the cultivation of crops planted with a lister; and the principal object of this invention is to provide a multi-section harrow each section having a pair of runners so formed and related to each other that they will fit closely in a furrow, and each runner being provided with teeth capable of removing all small weeds and grass when the plant is too small for a shovel cultivator and which furthermore will not cover the small plant; the runners of each section being also operative to smooth down the sides of the ridge or furrow so as to retain the moisture and not leave the same open to the hot sun, will adjust itself to uneven listing, and either narrow or wide rows.

With the foregoing and other objects in view, the invention resides in the novel arrangement and combination of parts and in the details of construction hereinafter described and claimed, it being understood that changes in the precise embodiment of the invention hereinafter disclosed may be made within the scope of what is claimed without departing from the spirit of the invention.

A practical embodiment of the invention is illustrated in the accompanying drawing wherein.

Figure 1:
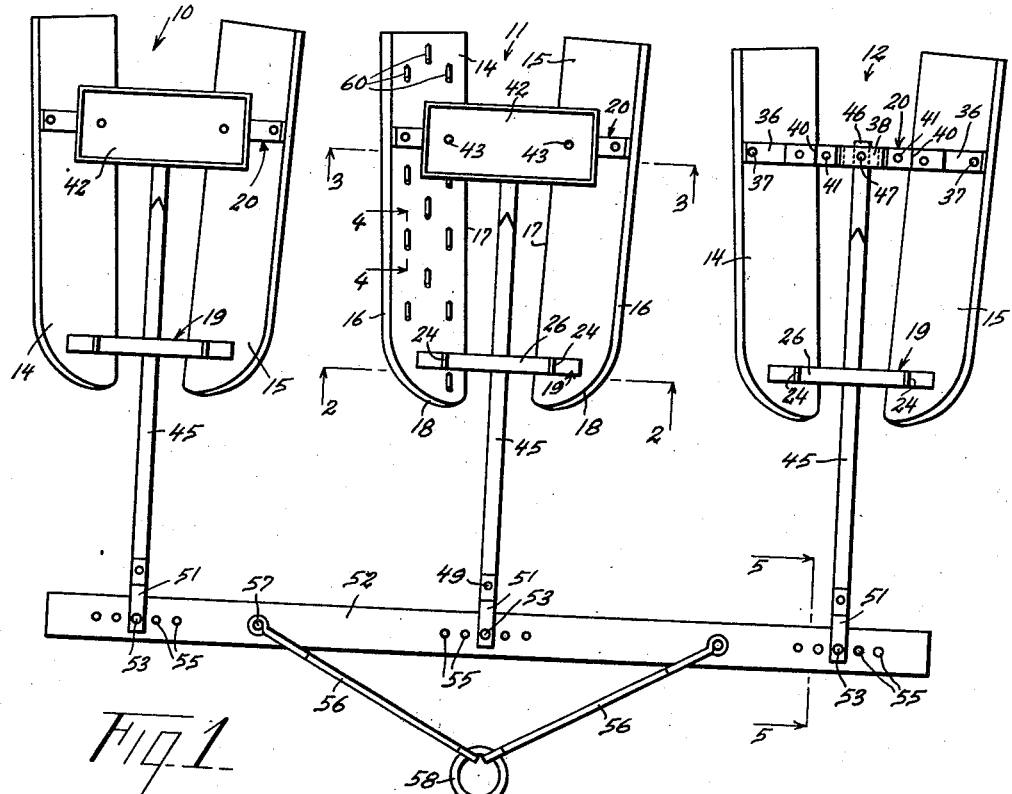
Figure 1 is a plan view of a lister harrow constructed in accordance with this invention, showing the weight box removed from one of the harrow sections and with the teeth shown on one of the runner boards only.
Figure 2:
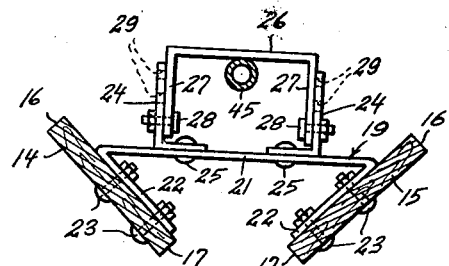
Figure 2 is a transverse sectional view of one harrow section taken on line 2—2, Fig. 1.
Figure 3:
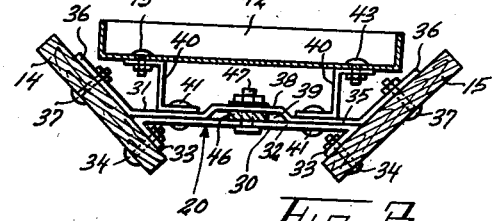
Figure 3 is a transverse sectional view of the same harrow unit taken on line 3—3, Fig. 1.

Referring to the drawing in detail, 10, 11 and 12 denote generally three identical harrow sections arranged in side by side relationship. While only three sections have been shown it is to be understood that the invention contemplates the use of any desired number. As the harrow sections are identical a detailed description of one will suffice. Thus, a harrow section comprises a pair of identical runner boards 14 and 15, each tapering in width from their rear end to their forward end such that the outer edge 16 is inclined with relation to the inner edge 17 and which outer edge 16 is rounded at the forward end of the runner board, as at 18. The runner boards 14 and 15 are disposed in a 45° angular relationship to the horizontal, as clearly shown in Figs. 2 and 3, with their inner edges 17 lowermost and are retained in this fixed relationship by a forward brace 19 and a rear brace 20. Preferably the runner boards 14 and 15 are arranged in lengthwise inclined relation such that the forward ends thereof are spaced apart a closer distance than the rear ends thereof, as clearly shown in Fig. 1.

The forward brace 19 is formed of a metallic strap and shaped to provide a horizontal portion 21 and downwardly and inwardly inclined leg portions 22, each at a 45° angle to the horizontal portion 21. Each leg 22 is rigidly secured to its associated runner board by a pair of bolts or rivets 23. Mounted on the horizontal portion 21 are a pair of angle brackets 24 rigidly secured thereto as by the rivets 25, and each equally spaced from the longitudinal center of the horizontal portion which lies in the vertical center plane between the runner boards 14 and 15. Bridging the angle brackets 24 is an inverted U-shaped guide and support 26, the legs 27 of which are disposed inwardly of and in abutting engagement with the vertical legs of the angle brackets 24 and are secured thereto in vertically adjustable position by means of the bolts 28. As shown, see Fig. 2, the vertical legs of the angle brackets 24 are each provided with a row of openings 29, to permit this vertical adjustment.

The rear brace 20 comprises superposed brace elements 30 and 31 each formed of a metal strap. The lower brace element 30 is shaped to provide a horizontal portion 32 and downwardly inwardly inclined legs 33, at a 45° angle to the horizontal portion 32, each leg being rigidly secured to an associated runner board by a bolt or rivet 34. The upper brace element 31 likewise is shaped to provide a horizontal portion 35 and upwardly outwardly inclined legs 36, at a 45° angle to the horizontal portion 35, each leg being rigidly secured to an associated runner board by a bolt or rivet 37. At its center the horizontal portion 35 is bowed upwardly as at 38 to define with the horizontal portion 32 a bearing support and connection 39 to be hereinafter described. Disposed on each side of the bearing support 39 is a Z-angle bracket 40 rigidly secured at its lower horizontal leg to the rear brace 20 by means of a rivet 41. The upper horizontal legs of the brackets 40 are directed towards their adjacent runner boards and are in the same horizontal plane, and seated thereon is a weight box 42 removably secured thereto as by the bolts 43.

Suitable forms of weight means (not shown) are adapted to be placed in the weight box 42 of each harrow section to hold the same down in the furrow and to provide the necessary traction in the use thereof in the manner well known.

Each harrow section is provided with a pull bar or tongue 45 formed of tubular or solid bar stock, the inner end 46 of which projects through the bearing support 39 wherein it has a loose fit and is pivotally secured therein by the vertical pivot bolt 47 whereby to permit lateral swinging movement. The outer end of the tongue 45 is flattened as at 48 and has fixed thereto by means of the rivet 49 an arm bracket 50 to define with the flattened end 48 a yoke 51.

Figure 5:
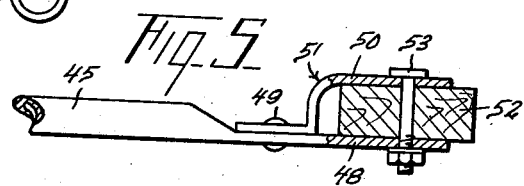
Figure 5 is a detail sectional view on line 5—5, Fig. 1, showing yoke connection of a harrow section tongue to transverse draft bar.

The tongues 45 of each of the harrow sections are each of the same length and are each attached by their yoke end 50 to a draft bar 52 seated therein and connected together by the pivot bolt 53, in the manner clearly shown in Fig. 5. The tongue 45 extends through the U-shaped guide and support 26 mounted on the brace 19, the support 26 rests on the tongue 45 and functions to hold up the forward end of the harrow unit in the manner readily apparent, and may be adjusted in the manner as described above in accordance with the type of tractor to which the harrow is hitched. The opening in the inner end 46 of the tongue 45 through which the vertical pivot bolt 47 extends is made slightly oversize which along with the loose fit in the bearing support 39 will be sufficient to allow the required slight vertical swinging movement of the harrow section relative to the tongue 45 on the pivot bolt 47, thus permitting the support 26 to rest on said tongue in all adjusted positions of the support 26. The draft bar 52 is provided with a row of openings 55 at each end thereof and at the center, arranged in longitudinal alignment to selectively receive therein the pivot bolt 53. A pair of draft links 56 are pivotally connected at their inner ends at 57 to the draft bar 52 and at their outer ends to a hitch ring 58 which is adapted to be connected by means of a clevis (not shown) to a tractor draw bar (not shown) in the manner well known.

Figure 4:
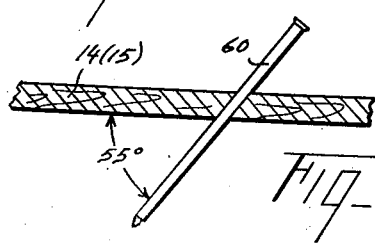
Figure 4 is a detail view on line 4—4, Fig. 1, showing tooth mounting on a runner board.

Each runner board has mounted thereon a plurality of rows of steel teeth 60. As the runner boards are preferably of a thickness not less than two inches, the teeth 60 which may be in the form of spikes may be driven through the board. It is desirable that the teeth be inclined in a rearwardly direction with reference to the runner board preferably at a 55° angle, see Fig. 4, and to project downwardly therefrom a substantial distance. At this angle the teeth are securely held by the board and will not drag trash, etc., but will stay clean.

The advantages of a harrow constructed in accordance with the invention as described above will be readily apparent to those skilled in the art of agriculture.

Having thus described the invention, what is claimed is:

1. A harrow device of the character described comprising a plurality of like harrow sections, each harrow section comprising a pair of runner boards, a plurality of rows of teeth mounted on each runner board, forward and rear brace means connecting said runner boards in spaced inclined relation, a pull tongue extending between said runner boards and pivotally connected at one end to the rear brace means, means connecting the other end of the pull tongue to a draft bar, and guide means on the forward brace means engaging an intermediate portion of said pull tongue whereby to support the forward end of said runner boards and to guide said pull tongue for lateral movement relative to said runner boards.

2. A harrow device of the character described comprising a plurality of like harrow sections, each harrow section comprising a pair of runner boards, a plurality of rows of teeth mounted on each runner board, forward and rear brace means connecting said runner boards in spaced inclined relation, said runner boards being each transversely inclined at a 45° angle to the horizontal in a direction towards each other and with their lower edges in the same horizontal plane, and longitudinally inclined towards each other in a direction toward their forward ends, a pull tongue extending between said runner boards and pivotally connected at one end to the rear brace means, means connecting the other end of the pull tongue to a draft bar, and guide means on the forward brace means engaging an intermediate portion of said pull tongue whereby to support the forward end of said runner boards and to guide said pull tongue for lateral movement relative to said runner boards.

3. A harrow device of the character described comprising a plurality of like harrow sections, each harrow section comprising a pair of runner boards, each runner board having a straight inside edge and an inclined outside edge directed forwardly of the runner board with its forward end curved to meet said inside edge whereby the runner board tapers in width from its rear end to its forward end, forward and rear brace means rigidly connecting said runner boards in spaced inclined relation, a plurality of rows of teeth mounted on each runner board, a pull tongue extending between said runner boards, bearing means on the rear brace means receiving the rear end of said pull tongue, vertical pivot means connecting said pull tongue rear end to said bearing means, yoke means on the other end of said pull tongue, a transverse draft bar mounted in said yoke means and pivotally connected thereto, and guide and support means on the forward brace means engaging an intermediate portion of said pull tongue whereby to support the forward end of said runner boards and to guide said pull tongue for lateral movement relative to said runner boards.

4. A harrow device of the character described comprising a plurality of like harrow sections, each harrow section comprising a pair of runner boards, each runner board having a straight inside edge and an inclined outside edge directed forwardly to the runner board with its forward end curved to meet said inside edge whereby the runner board tapers in width from its rear end to its forward end, forward and rear brace means rigidly connecting said runner boards in spaced inclined relation, said runner boards being each transversely inclined at a 45° angle to the horizontal in a direction towards each other and with their lower edges in the same horizontal plane, and longitudinally inclined towards each other in a direction toward their forward ends, a plurality of rows of teeth mounted on each runner board, each tooth being inclined in a rearward direction at a 55° angle to the plane of the runner board, and projecting a substantial distance below the underside of its associated runner board, a pull tongue extending between said runner boards, bearing means on the rear brace means receiving the rear end of said pull tongue, vertical pivot means connecting said pull tongue rear end to said bearing means, yoke means on the other end of said pull tongue, a transverse draft bar mounted in said yoke means and pivotally connected thereto, and guide and support means on the forward brace means engaging an intermediate portion of said pull tongue whereby to support the forward end of said runner boards and to guide said pull tongue for lateral movement relative to said runner boards.

5. A harrow device of the character described comprising a plurality of like harrow sections, each harrow section comprising a pair of runner boards, a plurality of rows of teeth mounted on each runner board, forward and rear brace means connecting said runner boards in spaced inclined relation, a pull tongue extending between said runner boards and pivotally connected at one end to the rear brace means, means connecting the other end of the pull tongue to a draft bar, and guide means on the forward brace means engaging an intermediate portion of said pull tongue whereby to support the forward end of said runner boards and to guide said pull tongue for lateral movement relative to said runner boards, said guide means including a pair of spaced angle brackets mounted on the forward brace means, an inverted U-shaped bracket bridging said angle brackets, and vertically adjustable means connecting said U-shaped bracket to said angle brackets.

6. A harrow device of the character described comprising a plurality of like harrow sections, each harrow section comprising a pair of runner boards, a plurality of rows of teeth mounted on each runner board, forward and rear brace means connecting said runner boards in spaced inclined relation, said runner boards being each transversely inclined at a 45° angle to the horizontal in a direction towards each other and with their lower edges in the same horizontal plane, and longitudinally inclined towards each other in a direction toward their forward ends, a pull tongue extending between said runner boards and pivotally connected at one end to the rear brace means, means connecting the other end of the pull tongue to a draft bar, a weight carrying box detachably mounted on said rear brace means, and guide means on the forward brace means engaging an intermediate portion of said pull tongue whereby to support the forward end of said runner boards and to guide said pull tongue for lateral movement relative to said runner boards.

7. A harrow device of the character described comprising a plurality of like harrow sections, each harrow section comprising a pair of runner boards, each runner board having a straight inside edge and an inclined outside edge directed forwardly of the runner board with its forward end curved to meet said inside edge whereby the runner board tapers in width from its rear end to its forward end, forward and rear brace means rigidly connecting said runner boards in spaced inclined relation, said runner boards being each transversely inclined at a 45° angle to the horizontal in a direction towards each other and with their lower edges in the same horizontal plane, and longitudinally inclined towards each other in a direction toward their forward ends, a plurality of rows of teeth mounted on each runner board, each tooth being inclined in a rearward direction at a 55° angle to the plane of the runner board, and projecting a substantial distance below the underside of its associated runner board, a pull tongue extending between said runner boards, a weight carrying box detachably mounted on said rear brace means, bearing means on the rear brace means receiving the rear end of said pull tongue, vertical pivot means connecting said pull tongue rear end to said bearing means, yoke means on the other end of said pull tongue, a transverse draft bar mounted in said yoke means and pivotally connected thereto, and guide and support means on the forward brace means engaging an intermediate portion of said pull tongue whereby to support the forward end of said runner boards and to guide said pull tongue for lateral movement relative to said runner boards, said guide and support means including a pair of spaced angle brackets mounted on the forward brace means, an inverted U-shaped bracket bridging said angle brackets, and vertically adjustable means connecting said U-shaped bracket to said angle brackets.

LYONEL ROSCOE BAYLESS.